3,303,024
NICKEL-BASE BRAZING ALLOYS
Arthur T. Cape, Monterey, Calif., assignor to Coast Metals, Inc., Little Ferry, N.J., a corporation of Delaware
No Drawing. Filed Dec. 23, 1963, Ser. No. 332,843
3 Claims. (Cl. 75—171)

This invention relates generally to nickel-base brazing alloys, but has reference more particularly to alloys of this type, in which chromium, silicon and iron are present for the purpose of imparting certain desired properties required in the alloy, and copper and cobalt may be present for imparting certain other desired properties to the alloy.

A primary object of the invention is to provide an alloy of the character described which can be used either in furnace brazing, or for torch brazing, using a flux.

Another object of the invention is to provide an alloy of the character described which is effective for brazing purposes in a hydrogen or argon atmosphere, in a vacuum, or in air, using a flux.

A further object of the invention is to provide a brazing alloy of the character described, which has a desired degree of toughness or strength, yet has good flow characteristics at temperatures within the range of from about 1900° F. to about 2050° F.

A still further object of the invention is to provide a brazing alloy of the character described which has physical properties superior to those of other nickel-silicon-boron alloys, particularly those described in AMS Specifications Nos. 4,775; 4,777; 4,778 and 4,779.

Other objects and advantages of the invention will appear in the course of the following description.

The alloys contemplated by the present invention are encompassed within the following ranges:

| | Percent |
|---|---|
| Boron | 0.75–3.00 |
| Chromium | 2–3.5 |
| Silicon | 3–3.75 |
| Copper | 0–8 |
| Iron | 6–11 |
| Cobalt | 0–5 |
| Nickel | Balance |

A preferred alloy, within the foregoing range, contains 1.9% boron, 2.8% chromium, 3.5% silicon, 6% copper, 3% cobalt, 7.5% iron, and the balance substantially all nickel.

For any boron-silicon content within the prescribed range, the alloy has relatively low hardness, as compared with alloys within the aforesaid AMS Specifications.

The alloys, moreover, are characterized by high strength, lack of brittleness, and relatively low melting points.

They are further characterized by the fact that the chromium content is relatively low, in relation to the iron content, the ratio or proportion of chromium to iron being about 1:3.

Although the presence of copper in the alloy is optional, it is of advantage in that it decreases the hardness of the alloy, which otherwise has a tendency to be hard, when the boron is high.

The cobalt, although present as an optional element, is of advantage as imparting to the alloy desired properties of toughness and strength.

The alloy may be used either in furnace brazing, or for torch brazing, in which a flux is usually employed.

The alloy may be used for brazing purposes in a hydrogen or argon atmosphere, in a vacuum, or in air, a flux being usually employed in air brazing.

The alloy has excellent flow characteristics at brazing temperatures within the range of from about 1900° F. to about 2050° F.

The expression, "the balance of the alloy being substantially all nickel" is to be understood as encompassing the presence in the alloy of small amounts of other elements, such as carbon, manganese, sulphur and phosphorus, usually present as impurities, and in amounts insufficient to appreciably affect the properties of the alloy.

Having thus described my invention, I claim:

1. A brazing alloy having excellent flow characteristics at brazing temperatures within the range of from about 1900° F. to about 2050° F. consisting of from 0.75 to 3.00 boron, 2 to 3.5% chromium, from 3 to 3.75% silicon, up to 8% copper, from 6 to 11% iron, and the balance essentially all nickel, the ratio of chromium to iron being maintained at all times at about 1:3.

2. A brazing alloy, as defined in claim 1, including up to 5% cobalt.

3. A brazing alloy as defined in claim 1, consisting of 1.9% boron, 2.8% chromium, 3.5% silicon, 6% copper, 3% cobalt, 7.5% iron, and the balance essentially all nickel.

References Cited by the Examiner

UNITED STATES PATENTS

| 2,868,667 | 1/1959 | Bowles | 75—171 |
| 2,880,086 | 3/1959 | Cape | 75—171 |
| 2,936,229 | 5/1960 | Shepard | 75—170 |

DAVID L. RECK, *Primary Examiner.*

HYLAND BIZOT, R. O. DEAN, *Assistant Examiners.*